(12) United States Patent
Sridharan et al.

(10) Patent No.: US 8,751,435 B2
(45) Date of Patent: Jun. 10, 2014

(54) SYSTEM AND METHOD FOR DETERMINING CLIENT-BASED USER BEHAVIORAL ANALYTICS

(75) Inventors: Krishnamurthy Sridharan, San Jose, CA (US); Ashok Sunder Rajan, Burnaby (CA)

(73) Assignee: Intel Corporation, Santa Clara, CA (US)

( * ) Notice: Subject to any disclaimer, the term of this patent is extended or adjusted under 35 U.S.C. 154(b) by 437 days.

(21) Appl. No.: 12/978,119

(22) Filed: Dec. 23, 2010

(65) Prior Publication Data

US 2012/0166380 A1    Jun. 28, 2012

(51) Int. Cl.
*G06F 9/44* (2006.01)

(52) U.S. Cl.
USPC ................................................. 706/52

(58) Field of Classification Search
None
See application file for complete search history.

(56) References Cited

U.S. PATENT DOCUMENTS

| | | | | |
|---|---|---|---|---|
| 4,843,577 | A * | 6/1989 | Muramoto | 702/131 |
| 5,406,477 | A * | 4/1995 | Harhen | 703/6 |
| 6,438,500 | B1 * | 8/2002 | Froger et al. | 702/55 |
| 7,743,007 | B2 * | 6/2010 | Jung et al. | 706/21 |
| 7,921,069 | B2 * | 4/2011 | Canny et al. | 706/47 |
| 7,962,437 | B2 * | 6/2011 | Brandenburg et al. | 706/48 |
| 7,962,505 | B2 * | 6/2011 | Torrens et al. | 707/767 |
| 8,301,770 | B2 * | 10/2012 | van Coppenolle et al. | 709/225 |
| 2005/0203924 | A1 * | 9/2005 | Rosenberg | 707/100 |
| 2005/0273376 | A1 * | 12/2005 | Ouimet et al. | 705/10 |
| 2007/0094182 | A1 * | 4/2007 | Jung et al. | 706/21 |
| 2007/0113266 | A1 * | 5/2007 | Ross et al. | 726/1 |
| 2007/0123472 | A1 * | 5/2007 | Jung et al. | 514/24 |
| 2008/0021854 | A1 * | 1/2008 | Jung et al. | 706/45 |
| 2009/0006363 | A1 * | 1/2009 | Canny et al. | 707/5 |
| 2009/0125248 | A1 * | 5/2009 | Shams et al. | 702/20 |
| 2009/0216602 | A1 * | 8/2009 | Henderson | 705/9 |
| 2010/0131352 | A1 * | 5/2010 | Malhotra et al. | 705/14.42 |
| 2010/0274815 | A1 * | 10/2010 | Vanasco | 707/798 |
| 2011/0131160 | A1 * | 6/2011 | Canny et al. | 706/12 |
| 2011/0173143 | A1 * | 7/2011 | Benjamini et al. | 706/12 |
| 2011/0184768 | A1 * | 7/2011 | Norton et al. | 705/5 |
| 2011/0184772 | A1 * | 7/2011 | Norton et al. | 705/7.18 |
| 2011/0184943 | A1 * | 7/2011 | Norton et al. | 707/723 |
| 2011/0185418 | A1 * | 7/2011 | Boteler et al. | 726/22 |

(Continued)

OTHER PUBLICATIONS

Richard Koch, "The 80/20 Principle," Nicholas Brealey, 1997.*

(Continued)

*Primary Examiner* — Kakali Chaki
*Assistant Examiner* — Fuming Wu
(74) *Attorney, Agent, or Firm* — Barnes & Thornburg, LLP (57) ABSTRACT

A method, system, and device for determining client-based user behavioral analytics includes monitoring for a predetermined behavioral event on a computing device. The predetermined behavioral event may be embodied as any event initiated by the user on the computing device such as the purchase of a product, selection of a web link, navigation to a website, etc. In response to an occurrence of the predetermined behavioral event, an affinity metric and an avidity metric are determined based on a frequency of the occurrences of the predetermined behavioral event. A behavioral index for the user is determined based on the affinity metric and the avidity metric. Additionally, in response to receiving a request for the behavioral index, the computing device may transmit the behavioral index to a content provider server or other remote computer and receive content from the content provider, which has been selected based on the user's behavioral index.

20 Claims, 4 Drawing Sheets

(56) References Cited

U.S. PATENT DOCUMENTS

2011/0185419 A1* 7/2011 Boteler et al. ............... 726/22
2012/0101966 A1* 4/2012 van Coppenolle et al. ..... 706/20
2012/0105723 A1* 5/2012 van Coppenolle et al. ... 348/564
2012/0110179 A1* 5/2012 van Coppenolle et al. ... 709/225

OTHER PUBLICATIONS

Sundardas S. Dorai-Raj, "First- and Second-Order Properties of Spatiotemporal Point Progresses in the Space-Time and Frequency Domains," Ph.D. Thesis, Virginia Polytechnic Institute and State University, 2001.*

"Nielsen ratings", retreived from "http://en.wikipedia.org/wiki/Nielsen_ratings" and last modified on Apr. 4, 2011; 7 pages.

"Audience measurement", retreived from "http://en.wikipedia.org/wiki/Audience_measurement" and last modified on Apr. 4, 2011; 6 pages.

"Intel Active Management Technology", retrieved from "http://en.wikipedia.org/wiki/Intel_Active_Management_Technology" and last modified on Mar. 29, 2011; 11 pages.

* cited by examiner

SYSTEM AND METHOD FOR DETERMINING CLIENT-BASED USER BEHAVIORAL ANALYTICS

BACKGROUND

Online user behavioral analytics are used by advertisers, advertisement networks, and other content providers for targeting online advertisements, offers, suggestions, and other digital content to particular audiences. In many implementations, online user behavioral analytics are collected and generated by a content server and/or an independent behavioral analytics server (i.e., the user behavioral analytics are server-based). To do so, the server monitors the behavior of the user while interacting with the analytics server, other servers monitored by the analytics server, and/or monitored online services provided to the user. Based on the user's behavior and preferences, the behavioral analytics server may determine which advertisements to present to the user, which products to suggest to the user, how to structure an online interface, and/or which other digital content to provide to the user.

Because the behavioral analytics servers monitor the user's interaction with the particular server and/or with other specific, monitored servers or services, typical user behavioral analytics are content-dependent and/or source-dependent. That is, only the user's behavior with the particular monitored servers or services are considered. For example, an online bookseller may be able to determine a user's preference for books based on past viewing and purchases, but is unable to make any further inferences based on the user's preference for other content such as movies and songs. As such, typical server-based behavioral analytics have a limited scope and may not fully represent a user's behavior and preferences.

BRIEF DESCRIPTION OF THE DRAWINGS

The systems, devices, and methods described herein are illustrated by way of example, and not by way of limitation, in the accompanying figures. For simplicity and clarity of illustration, elements illustrated in the figures are not necessarily drawn to scale. For example, the dimensions of some elements may be exaggerated relative to other elements for clarity. In the following figures.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices may be set forth in order to provide a more thorough understanding of the present disclosure. It will be appreciated, however, by one skilled in the art that embodiments of the disclosure may be practiced without such specific details. In other instances, control structures, gate level circuits, and full software instruction sequences may have not been shown in detail in order not to obscure the disclosure. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Some embodiments of the disclosure may be implemented in hardware, firmware, software, or any combination thereof. Embodiments of the disclosure implemented in a computer system may include one or more bus-based interconnects between components and/or one or more point-to-point interconnects between components. Embodiments of the invention may also be implemented as instructions stored on a machine-readable, tangible medium, which may be read and executed by one or more processors. A machine-readable, tangible medium may include any tangible mechanism for storing or transmitting information in a form readable by a machine (e.g., a computing device). For example, a machine-readable, tangible medium may include read only memory (ROM); random access memory (RAM); magnetic disk storage media; optical storage media; flash memory devices; and other tangible mediums.

Figure 1:
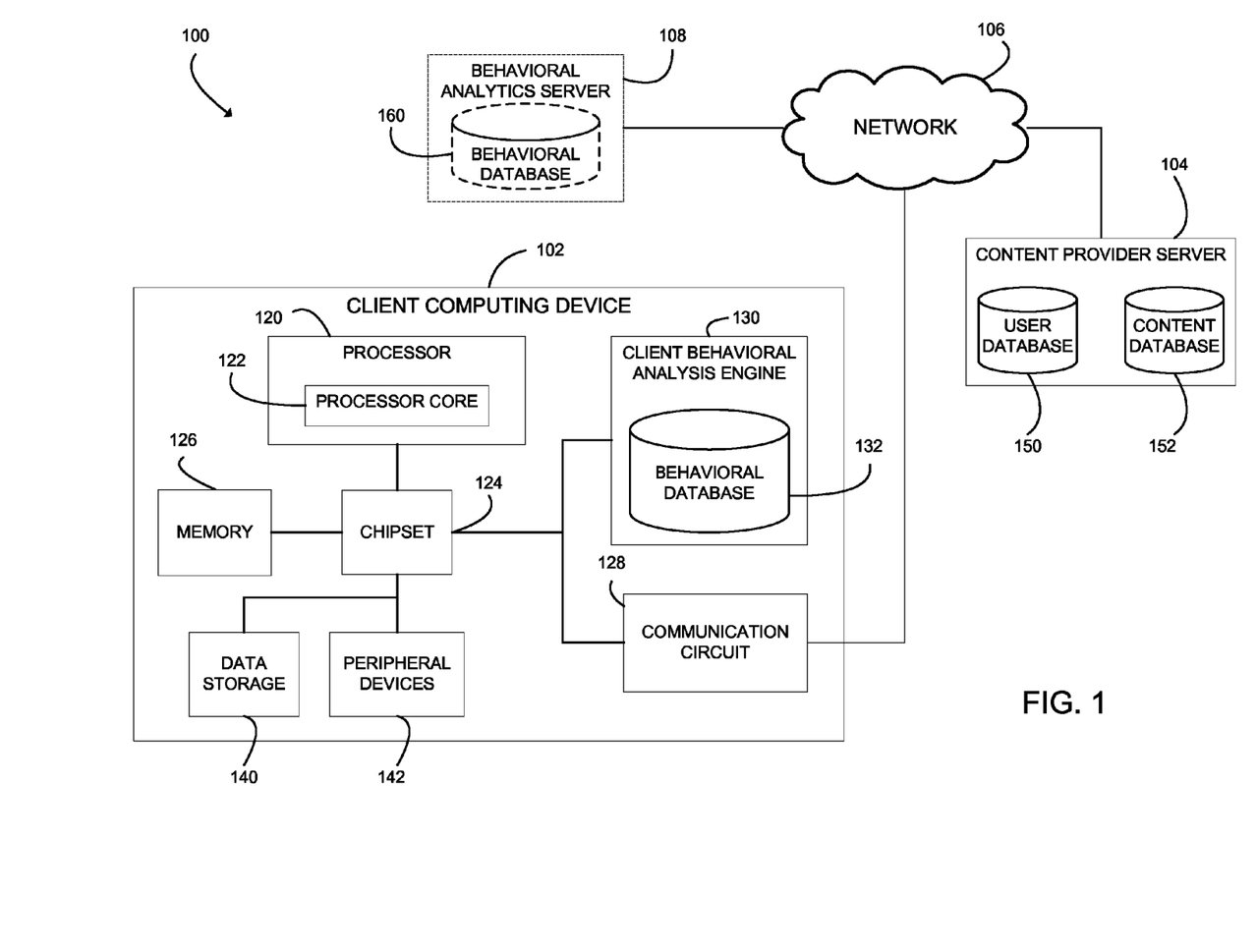
FIG. 1 is a simplified block diagram of one embodiment of a system for determining client-based user behavioral analytics and distribution of content based on such client-based user behavioral analytics.

Referring now to FIG. 1, a system 100 for determining client-based user behavioral analytics and distributing content based on such client-based user behavioral analytics includes a client computing device 102 and a content provider server 104. The client computing device 102 is communicatively coupled to the content provider server 104 via a network 106. In some embodiments, the system 100 may also include a behavioral analytics server 108, which is also coupled to the client computing device 102 and the content provider server 104 via the network 106.

As discussed in more detail below, the client computing device 102 is configured to monitor a user's behavior on the client computing device and provide abstracted behavioral analytic data to the content provider server 104 (or the behavioral analytics server 108) from which the server 104 may determine which content to provide to the user of the client computing device 104. The monitored user behavior may include online behavior initiated on the client computing device 102 by the user such as websites visited, interactions with such websites, products purchased, content viewed, and other online behavior. Additionally, in some embodiments, the monitored user behavior may include offline behavior initiated on the client computing device 102 by the user such as viewing of downloaded content, interaction with such content, execution of downloaded applications, and/or the like.

The client computing device 102 may be embodied as any type of electronic device capable of performing the functions described herein. For example, the computing device 102 may be embodied as a personal computer, a workstation, a laptop computer, a handheld computer, a mobile internet device, a cellular phone, a personal data assistant, a telephony device, a network appliance, a virtualization device, a storage controller, or other computer-based device.

In the illustrative embodiment of FIG. 1, the computing device 102 includes a processor 120, a chipset 124, a memory 126, a communication circuit 128, and a client behavioral analysis engine 130. In some embodiments, the computing device 102 may also include one or more data storage devices 140 and/or one or more additional peripheral devices 142. Additionally, in some embodiments, several of the foregoing components may be incorporated on a motherboard of the computing device 102, while other components may be communicatively coupled to the motherboard via, for example, a peripheral port. Furthermore, it should be appreciated that the computing device 102 may include other components, sub-components, and devices commonly found in a computer and/or computing device, which are not illustrated in FIG. 1 for clarity of the description.

The processor 120 of the computing device 102 may be embodied as any type of processor capable of executing software/firmware, such as a microprocessor, digital signal processor, microcontroller, or the like. The processor 120 is illustratively embodied as a single core processor having a processor core 122. However, in other embodiments, the processor 120 may be embodied as a multi-core processor having multiple processor cores 122. Additionally, the computing device 102 may include additional processors 120 having one or more processor cores 122. The processor 120 is generally responsible for executing a software stack, which may include an operating system and various applications, programs, libraries, and drivers resident on the computing device 102.

The chipset 124 of the computing device 102 may include a memory controller hub (MCH or "northbridge"), an input/output controller hub (ICH or "southbridge"), and a firmware device. In such embodiments, the firmware device may be embodied as a memory storage device for storing Basic Input/Output System (BIOS) data and/or instructions and/or other information. Of course, in other embodiments, chipsets having other configurations may be used. For example, in some embodiments, the chipset 124 may be embodied as a platform controller hub (PCH). In such embodiments, the memory controller hub (MCH) may be incorporated in or otherwise associated with the processor 120.

The chipset 124 is communicatively coupled to the processor 120 via a number of signal paths. These signal paths (and other signal paths illustrated in FIG. 1) may be embodied as any type of signal paths capable of facilitating communication between the components of the computing device 102. For example, the signal paths may be embodied as any number of wires, cables, light guides, printed circuit board traces, via, bus, intervening devices, and/or the like.

The memory 126 of the computing device 102 is also communicatively coupled to the chipset 124 via a number of signal paths. The memory 126 may be embodied as one or more memory devices or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. Additionally, although only a single memory device 126 is illustrated in FIG. 1, in other embodiments, the computing device 102 may include additional memory devices. The operating system, applications, programs, libraries, and drivers that make up the software stack executed by the processor 120 may reside in memory 126 during execution. Furthermore, software and data stored in memory 126 may be swapped between memory 126 and one or more data storage devices 140 as part of memory management operations.

The communication circuit 128 of the computing device 102 may be embodied as any number of devices and circuitry for enabling wired communications between the computing device 102 and one or more remote devices (such as content provider server 104) over a wired network (i.e., over wired portions of the network 106). For example, the communication circuit 128 may include one or more wired network interfaces to facilitate wired communications. The communication circuit 128 is also communicatively coupled to the chipset 124 via a number of signal paths, allowing the processor 120 to access the communication circuit 128.

The client behavioral analysis engine 130 may be embodied as hardware and/or software for monitoring the user's behavior on the client computing device 102 and generating user behavioral analytics based thereon as discussed in more detail below. The client behavioral analysis engine 130 may include a behavioral database 132 in which behavioral event data is stored. In some embodiments, the client behavioral analysis engine 130 may be embodied as or otherwise include a secure processor. For example, the client behavioral analysis engine 130 may be embodied as a trusted platform module (TPM), a secured co-processor, or other secured hardware device of the client device 102.

As discussed above, the computing device 102 may also include one or more data storage devices 140 and one or more peripheral devices 142. In such embodiments, the chipset 124 is also communicatively coupled to the one or more data storage devices 140 and the one or more peripheral devices 142. The data storage device(s) 140 may be embodied as any type of device or devices configured for the short-term or long-term storage of data such as, for example, memory devices and circuits, memory cards, hard disk drives, solid-state drives, or other data storage devices. The peripheral device(s) 142 may include any number of peripheral devices including input devices, output devices, and other interface devices. For example, the peripheral devices 142 may include a display, mouse, keyboard, and external speakers of the computing device 102. The particular devices included in the peripheral devices 142 may depend upon, for example, the intended use of the computing device 102.

The network 106 may be embodied as any type of wired and/or wireless network such as a local area network, a wide area network, a publicly available global network (e.g., the Internet), or other network. Additionally, the network 106 may include any number of additional devices to facilitate communication between the computing device 102 and the content provider server 104 such as routers, switches, intervening computers, and the like.

The content provider server 104 may be embodied as any type of server computer configured to communicate with the client computing device 102 over the network 106 to distribute content to the computing device 102. In some embodiments, the content provider server 104 may include a user database 150 and a content database 152. The user database 150 may include user profile data and other demographic data related to the user and/or to the demographic of the user. For example, in some embodiments, the user database 150 may include profile data about the user such as gender, age, address, and the like. Additionally, in some embodiments, the user database 150 may include content preferences of various demographics to which the user may belong. The content database 152 may include digital content that may be presented to a user of the client computing device 102. Such digital content may be embodied as any type of digital content presentable to the user on the computing device 102 such as, for example, advertisements, videos, images, information, and/or other data.

In some embodiments, the system 100 may also include a behavioral analytics server 108, which is communicatively coupled to the client computing device 102 and the content provider server 104 via the network 106. The behavioral analytics server 108 includes a behavioral database 160 and is configured to collect and store behavioral analytics from a plurality of client computing device 102 (i.e., from the client behavioral analysis engine 130 of the computing devices 102). In such embodiments, the behavioral analytics server 108 operates as an intermediary between the content provider server 104 and the computing device 102. That is, the content provider server 104 may communicate with the behavioral analytics server 108 to obtain behavioral analytics data about the user of the computing device 102 and provide digital content to the client computing device 102 based on such retrieved behavioral analytic data.

In use, the client computing device 102 is configured to monitor a user's behavior on the computing device 102 for predetermined behavioral events (e.g., visiting a website, selecting a web link, purchasing a produce, viewing particular content, and/or other online behavior) and generate behavioral analytical data based on such predetermined behavioral events. In the illustrative embodiment, the behavioral analytical data is abstracted to provide a level of security and privacy to the user. For example, for each behavioral event, the client computing device 102 may determine an affinity metric and an avidity metric. The affinity metric provides an indication of a trend in the frequency of the occurrences of the particular behavioral event. The avidity metric provides an indication of the ranking or level of the user's preference for the behavioral event (e.g., for the particular product or website) relative to other users or other predetermined measurement metric as discussed in more detail below. Based on the affinity metric and the avidity metric, the client computing device 102 determines a behavioral index, which summarizes the user's preference for the behavioral event. As such, the behavioral index provides an abstracted view of the user's behavior across all or a plurality of content sources (i.e., the user's behavioral index is not tied to a single source or content provider) and is used by the content provider server 104 to select digital content for presentation to the user on the client computing device 102.

Figure 2:
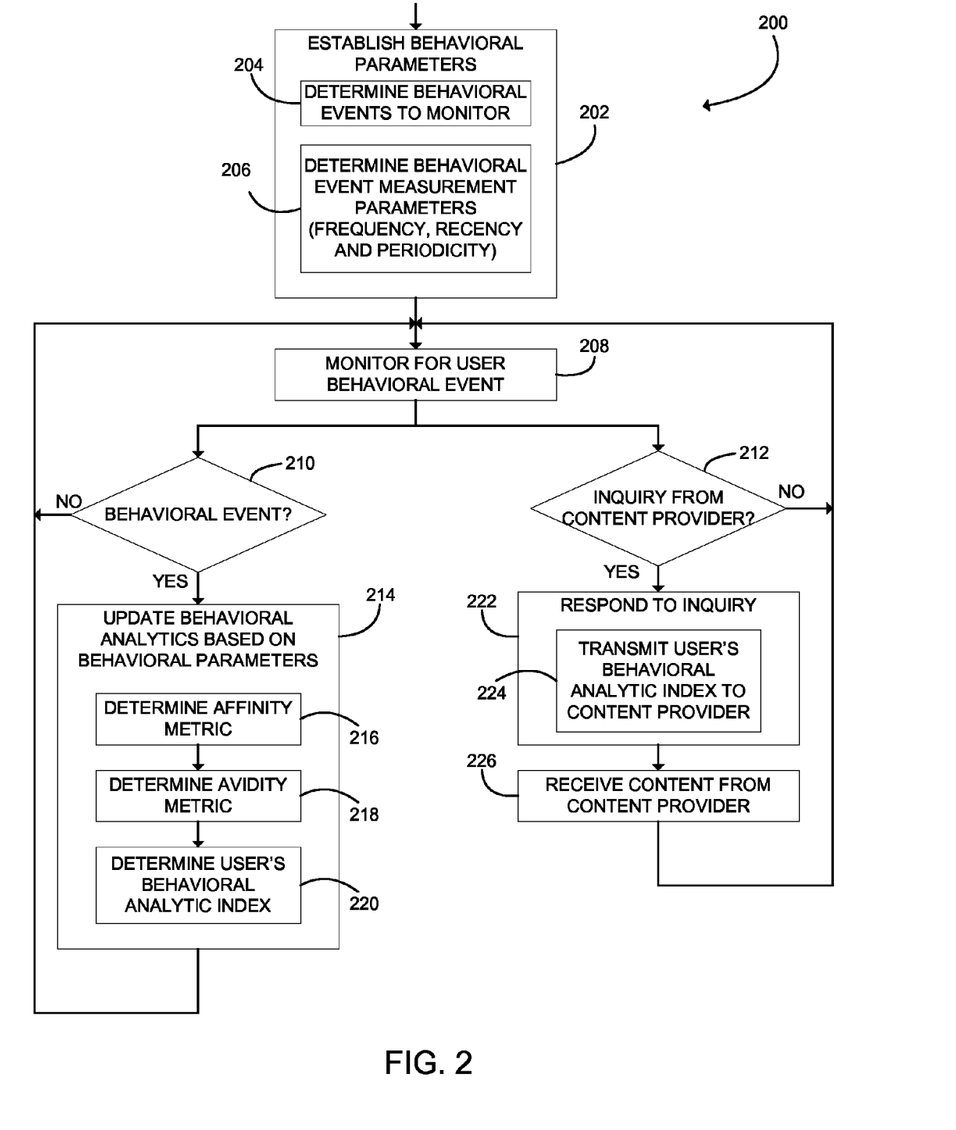
FIG. 2 is a simplified flow diagram of one embodiment of a method for determining client-based user behavioral analytics on a client computer of the system of FIG. 1.
Figure 3:
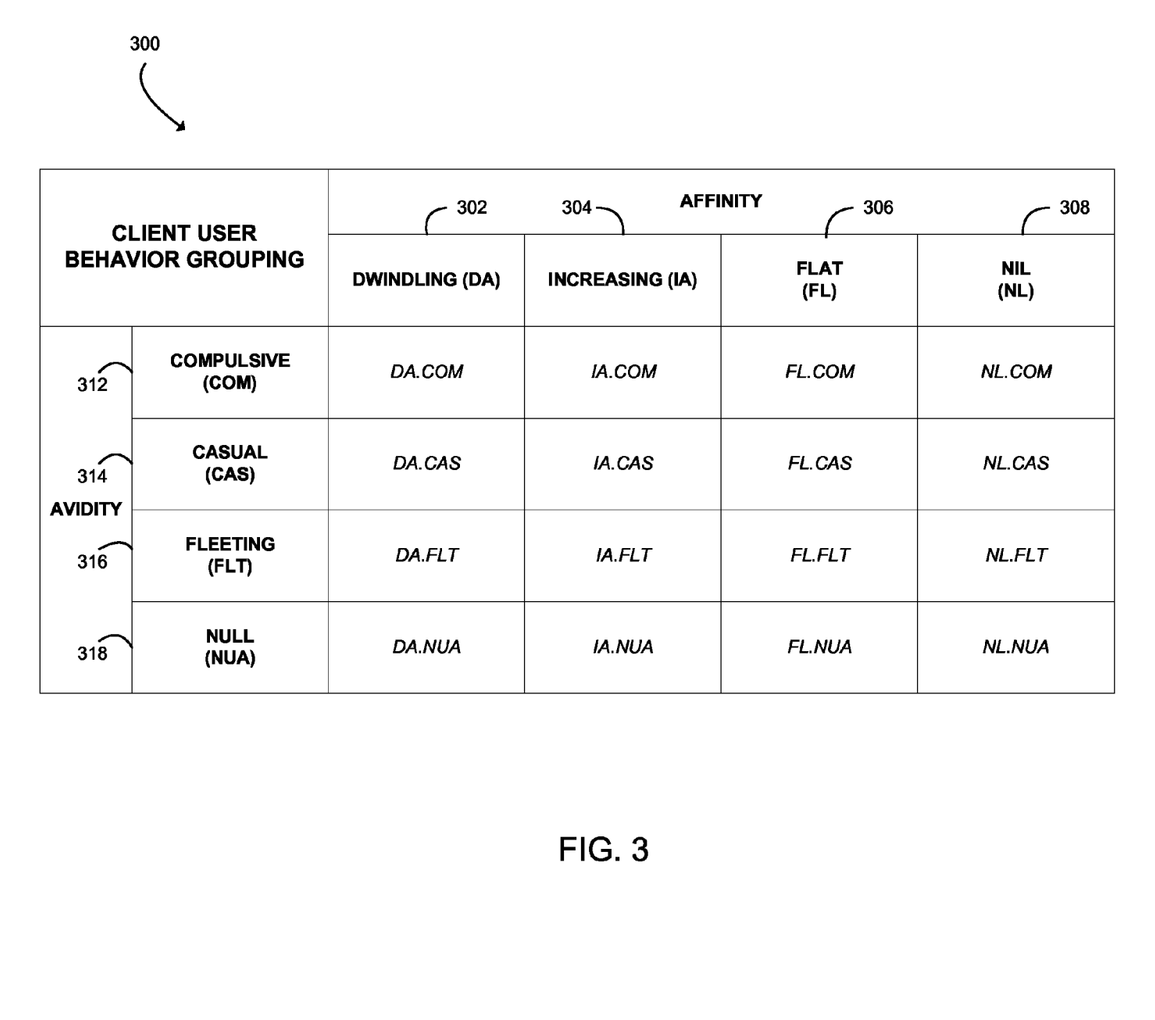
FIG. 3 is a simplified client user behavior grouping matrix for determining a user behavioral index based on an affinity grouping and an avidity grouping used by the client computer of FIG. 1.

Referring now to FIG. 2, the client computing device 102 (i.e., the client behavioral analysis engine 130) may execute a method 200 for determining client-based user behavioral analytics as discussed above. The method 200 begins with block 202 in which behavioral parameters are established. Such behavioral parameters may include the behavioral events to monitor and initial parameter values. For example, in block 204, the behavioral events that will be monitored by the client behavioral analysis engine 130 are determined As discussed above, the behavioral events may be embodied as any event or activity of interest initiated by the user on the client computing device. For example, the behavioral event may be embodied as websites visited, interactions with such websites, products purchased, content viewed, and other online behavior. It should be appreciated that the defined behavioral event is not source dependent. For example, if the behavioral event is defined as the purchase of music, the user purchasing music from any online source is monitored. Additionally, in some embodiments, the behavioral events may include offline behavior initiated on the client computing device 102 by the user such as viewing of downloaded content, interaction with such content, execution of downloaded applications, and/or the like. The particular behavioral events to be monitored may be selected or determined using any suitable methodology. For example, in some embodiments, the behavioral events are pre-identified by the behavioral analysis engine 130 (e.g., determined at time of manufacture of the client computing device 102), may be provided by the content provider server 104, may be selected by the user of the client computing device 102, or may be selected or determined using other selection criteria or methodology.

In block 206, initial parameter values may be set or otherwise determined. Such initial parameter values may include parameter values used to determine various user behavior metrics such as the affinity metric and avidity metric discussed below. For example, in one particular embodiment, the client behavioral analysis engine 130 tracks the frequency (F), recency (R), and periodicity (P) of each behavioral event of interest. In the illustrative embodiment, the frequency (F) of the behavioral event is defined as the number of occurrences of the behavioral event over a predetermined period of time (e.g., over a four hours, over a day, over a week, etc.). Additionally, the recency parameter of the behavioral event is defined as a predetermined period of time greater than the period of time of the frequency parameter (e.g., a multiple of the frequency period of time). For example, if the frequency (F) is defined as the number of occurrences of the behavioral event within a single day, the recency (R) of the behavioral event may be defined as, for example, a three-day window. As such, the change in frequency (F) over the recency (R) may be monitored as discussed in more detail below. Similarly, the periodicity (P) parameter of the behavioral event is defined as a predetermined period of time greater than the recency (R) parameter (e.g., a multiple of the recency parameter). For example, if the recency (R) parameter is defined as a three-day window, the periodicity parameter (P) may be defined three consecutive recency (R) periods (i.e., three three-day windows). In this way, the change in recency (R) over the periodicity (P) may be monitored as discussed below. Accordingly, in block 206, the periods of time of the frequency (F) parameter, recency (R) parameter, and periodicity (P) parameter may each be determined or selected in block 206.

In block 208, the client behavioral analysis engine 130 monitors for the predetermined user behavioral event(s). If the behavioral analysis engine 130 determines that no behavioral event has occurred in block 210, the method 200 loops back to block 208 to continue monitoring for a predetermined behavioral event. However, if the client behavioral analysis engine 130 determines that a behavioral event has occurred in block 210, the method advances to block 214 in which the client behavioral analysis engine 130 updates the behavioral analytics based on the behavioral parameters (i.e., the frequency (F), recency (R), and periodicity (P) of the behavioral event). For example, the behavioral analysis engine 130 may determine or update an affinity metric and an avidity metric for the behavioral event, and subsequently determine the user's behavioral analytic index for the event based on the affinity and avidity metrics as discussed below.

In the illustrative embodiment, the client behavioral analysis engine 130 determines or otherwise updates the affinity metric for the predetermined behavioral event in block 216. As discussed above, the affinity metric provides an indication of the trend in the frequency of the occurrences of the behavioral event. In the illustrative embodiment, the affinity metric is determined based on a first order function, which generally requires no historical data or learning period. For example, in the illustrative embodiment, one of a plurality of affinity groupings is assigned to the behavioral event based on the frequency (F) and recency (R) parameters of the event. If the frequency (F) of the behavioral event is decreasing over the recency (R) time period, a first grouping ("dwindling affinity") is assigned to the behavioral event. However, if the frequency (F) of the behavioral event is increasing over the recency (R) time period, a second grouping ("increasing affinity") is assigned to the behavioral event. Additionally, if the frequency (F) of the behavioral event is flat (i.e., neither substantially increasing nor decreasing) over the recency (R) time period, a third grouping ("flat affinity") is assigned to the behavioral event. Further, if no occurrences of the behavioral event is observed over the recency (R) time period (i.e., the frequency is zero), a fourth grouping ("nil affinity") may be assigned to the behavioral event. In this way, the trend of the frequency (F) of the behavioral event is defined according to one of a plurality of groupings. Although only four separate affinity groupings are defined in the illustrative embodiment, it should be appreciated that more or fewer groupings may be used in other embodiments. For example, additional groupings may be used to increase the resolution at which the frequency is increasing or decreasing. Additionally, it should be appreciated that other functions and algorithms may be used in other embodiments to determine the affinity metric.

In block 218, the client behavioral analysis engine 130 determines or otherwise updates the avidity metric for the predetermined behavioral event. As discussed above, the avidity metric provides an indication of the ranking or level of the user's preference for the behavioral event (e.g., for the particular product or website) relative to other users or other predetermined measurement metric as discussed in more detail below. In the illustrative embodiment, the avidity metric is determined based on a second order function, which generally utilizes historical data. To do so, the total number of occurrences of the behavioral event on the client computing device 102 is compared to a predetermined range of total occurrences, which may be predetermined (e.g., in block 202) or may be provided by a remote source (e.g., such as the content provider server 104). For example, in one particular embodiment, the total number of occurrences on the client computing device 102 is compared to a range of all total occurrences collected from a plurality of other clients. That is, the total number of occurrences of the behavioral event on the client computing device 102 is compared to the total occurrences of other users of other computing devices 102.

Regardless of the range of occurrences used (i.e., a predetermined range or a range determined based on other users), one of a plurality of avidity groupings is assigned to the behavioral event based on the total number of occurrences (TC) of the behavioral event within the recency (R) time period and the consistency of such total number. The total number of occurrences (TC) of the behavioral event over the recency (R) time period may be determined by multiplying the frequency (F) parameter by the recency (R) parameter (i.e., TC=F×R). If the total number of occurrences (TC) is greater than a predetermined threshold (e.g., within the top twenty percent of all occurrences) and substantially consistent over the periodicity (P) time period, a first grouping ("compulsive avidity") is assigned to the behavioral event. However, if the total number of occurrences (TC) is less than the predetermined threshold (e.g., less than the top twenty percent of all occurrences) and substantially consistent over the periodicity (P) time period, a second grouping ("casual avidity") is assigned to the behavioral event. Additionally, if the total number of occurrences (TC) falls within the predetermined range of total occurrences but is inconsistent (i.e., varies substantially) over the periodicity (P) time period, a third grouping ("fleeting avidity") is assigned to the behavioral event. Further, if the total number of occurrences (TC) falls below the range of total occurrences and is substantially consistent over the periodicity (P) time period, a fourth grouping ("nil avidity") may be assigned to the behavioral event. Again, although only four separate avidity groupings are defined in the illustrative embodiment, it should be appreciated that more or fewer groupings may be used in other embodiments. For example, additional groupings may be used to increase the resolution at which the avidity metric. Additionally, it should be appreciated that other functions and algorithms may be used in other embodiments to determine the avidity metric. Further, it should be appreciated that the affinity and avidity metrics may be determined in any order or substantially contemporaneously with each other.

Figure 4:
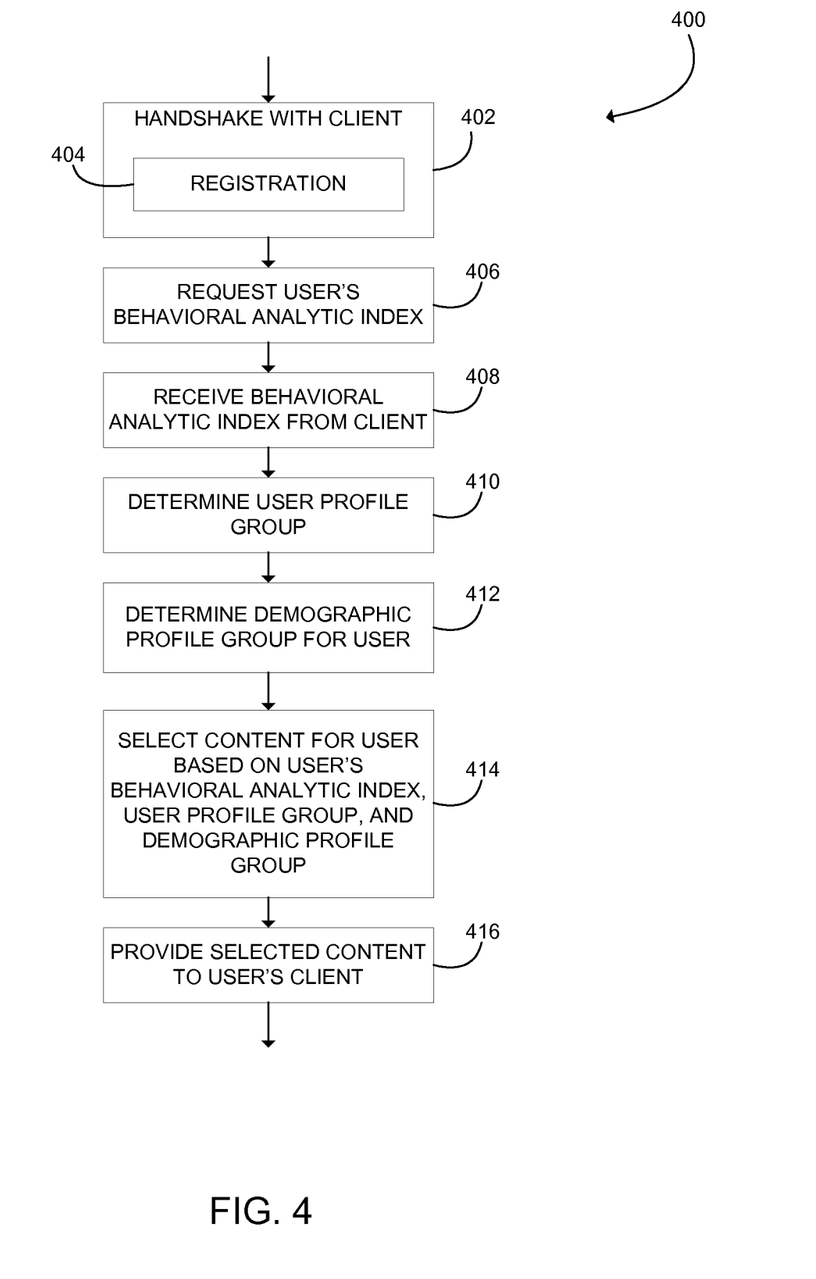
FIG. 4 is a simplified flow diagram of one embodiment of a method for distributing content using client-based user behavioral analytics of the client computer of the system of FIG. 1.

After the affinity and avidity metrics are determined or otherwise updated in blocks 216 and 218, the user's behavioral analytic index for the behavioral event is determined in block 220. The behavioral analytic index is determined based on the affinity and avidity metric groupings. For example, in the illustrative embodiment, the four affinity and four avidity metrics form a sixteen group behavioral index 300 as illustrated in FIG. 4. Based on the determined affinity and avidity groupings, the user's behavior for the monitored behavioral event falls within one of the sixteen groupings. The illustrative behavioral index 300 includes four affinity columns corresponding to the determined affinity metric: a dwindling affinity column 302, an increasing affinity column 304, a flat affinity column 306, and a nil affinity column 308. Similarly, the illustrative behavioral index 300 includes four avidity rows corresponding to the determined avidity metric: a compulsive avidity row 312, a casual avidity row 314, a fleeting avidity row 316, and a nil avidity row 318. Accordingly, by determining the appropriate affinity column and avidity row for the monitored behavior, the client behavioral analysis engine 130 can determine a behavioral index of the monitored behavioral event for the user. For example, if the user's behavior for the monitored behavioral event is determined to have increasing affinity (column 304) and fleeting avidity (row 316), the behavioral index for that behavioral event is determined to be "increasing-fleeting" (IA.FLT). As discussed in more detail below, the determined behavior index (e.g., "IA.FLT") may be supplied to the content provider server 104 (or to the behavioral analytics server 108), and the content provider server 104 may use the behavioral analytic index to determine which content to provide to the user.

It should be appreciated, however, that while the content provider server 104 is provided some amount of insight into the behavior of the user of the client computing device 102, the privacy of the user is maintained because the behavioral analytic index is an abstraction of the user's behavior. For example, if the monitored behavioral event is defined as the visitation of a particular website, the content provider server 104 may be provided with a behavioral analytic index indicating that the user is increasingly and compulsively visiting the website (i.e., a behavioral analytic index of "DA.COM")

but does not know the exact number of times the user has visited the website, the time of day the user has visited the website, and/or the like. In this way, the privacy of the user is maintained.

Referring now back to block 208, while monitoring for the user behavioral event, the client computing device 102 may also determine whether an inquiry from the content provider server 104 is received in block 212. If not, the method 200 loops back to block 208 in which the computing device 102 continues to monitor for the behavioral event(s). However, if an inquiry is received from the content provider server 104 in block 212, the client computing device 102 responds to the inquiry in block 222. For example, the content provider server 104 may request the behavioral index for a specific behavioral event (e.g. visits to a website, purchases of a product, etc). In response, the client computing device 102 transmits the behavioral analytic index (e.g., "DA.COM", "IA.CAS", etc.) for the specific behavioral event to the content provider server 104 in block 224. Of course, in some embodiments, the content provider server 104 may request multiple or all behavioral analytical indexes from the client computing device 102. Regardless, in block 226, the client computer 102 receives digital content from the content provider server 104. The digital content has been selected by the content provider server 104 based on the transmitted behavioral analytic index and, in some embodiments, other data or criteria (e.g., demographic data as discussed below). In this way, digital content may be provided to the user of the client computing device 102 based on the user's preferences and activities while maintaining an amount of privacy for the user.

Referring now to FIG. 4, a method 400 for distributing content using client-based user behavioral analytics of the client computing device 102 may be executed by the content provider server 104. The method 400 begins with block 402 in which the content provider server 104 and the client computing device 102 handshake with each other. That is, various parameters and settings may be established between the server 104 and the computing device 102 in block 402. For example, in block 404, the user of the client computing device 102 may register with the content provider server 104 or with another server monitored or otherwise serviced by the content provider server 104. During the registration process, the user may provide user profile data, such as the user's age, residence, gender, and the like. In other embodiments, such data may be obtained from other databases and/or servers that use and store similar user data, which may have been previously provided by the user or otherwise collected by the other databases/servers.

In block 406, the content provider server 104 requests the user's behavioral analytic index(es) for one or more behavioral events. As discussed above, the behavioral analytic index is an abstraction of the user's behavior and provides an amount of privacy to the user. For example, in one particular embodiment, no personally identifiable data regarding the user or any particulars of user behavior, such as the time and frequency of events, is shared. In block 408, the content provider server 104 receives the behavioral analytic index from the client computing device 102. In blocks 410 and 412, the content provider server 104 determines the user's individual profile group and the user's demographic group. The user's profile and demographic grouping may provide additional criteria on which the content provider server 104 may select digital content for the user. For example, the user's profile grouping may set forth specific preferences provided by the user (e.g., during the registration processor 404). Additionally, the demographic grouping may provide specific preferences for one or more demographic groups to which the user belongs (e.g., the male, age 24-36, demographic grouping). As such, in block 414, the content provider server 104 selects content for presentation to the user of the client computing device 104 based on the received behavioral analytic index and any additional criteria such as the user's profile group and the user's demographic group. The selected digital content is subsequently transmitted to the client computing device 102 in block 416 for presentation to the user. In this way, the content provider server 104 selects digital content based on the user's preferences and behavior while providing an amount of privacy and security to the user.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure and the appended claims are desired to be protected.

The invention claimed is:

1. A method comprising:
monitoring for a predetermined behavioral event initiated by a user on a client computer;
determining, on the client computer, an affinity metric for the predetermined behavioral event in response to an occurrence of the predetermined behavioral event, wherein determining the affinity metric comprises (i) determining a frequency of occurrence of the predetermined behavioral event for each of a plurality of first time periods, (ii) comparing the determined frequencies of occurrence of the predetermined behavioral event, and (iii) determining a historical trend of the frequency of occurrence of the predetermined behavioral event over a second time period equal to the sum of the plurality of first time periods based on the comparison of the determined frequencies;
determining, on the client computer, an avidity metric for the predetermined event in response to the occurrence of the predetermined behavioral event, wherein the avidity metric is indicative of a ranking of the frequency of occurrences relative to a predetermined criteria; and
determining, on the client computer, a behavioral index for the user based on the affinity metric and the avidity metric.

2. The method of claim 1, further comprising determining the frequency of occurrences of the predetermined behavioral event, wherein the frequency of occurrences is indicative of the number of occurrences during a first time period, and wherein:
determining the affinity metric comprises determining the affinity metric based on the frequency of occurrences of the predetermined behavioral event, and
determining the avidity metric comprises determining the avidity metric based on the frequency of occurrences of the predetermined behavioral event.

3. The method of claim 2, wherein the affinity metric is indicative of a trend in the frequency of occurrences of the predetermined behavioral event over a second time period, the second time period being a multiple of the first time period.

4. The method of claim 3, wherein determining the affinity metric comprises:
assigning a first affinity group to the predetermined behavioral event in response to the frequency of occurrences of the predetermined behavioral event being determined to be decreasing over the second time period;

assigning a second affinity group to the predetermined behavioral event in response to the frequency of occurrences of the predetermined behavioral event being determined to be increasing over the second time period; and assigning a third affinity group to the predetermined event in response to the frequency of occurrences of the predetermined behavioral event being determined to be substantially constant over the second time period.

5. The method of claim 2, wherein the avidity metric is indicative of a ranking of a total number of occurrences of the predetermined behavioral event within a second time period relative to a predetermined range of total occurrences, the second time period being a multiple of the first time period.

6. The method of claim 5, wherein determining the avidity metric comprises:

assigning a first avidity group to the predetermined event in response to the total number of occurrences of the predetermined behavioral event (i) being greater than a predetermined first percentage of the predetermined range of total occurrences and (ii) being substantially consistent over a third time period, the third period of time being a multiple of the second time period;

assigning a second avidity group to the predetermined event in response to the total number of occurrences of the predetermined behavioral event (i) being less than a predetermined second percentage of the predetermined range of total occurrences and (ii) being substantially consistent over the third time period; and assigning a third avidity group to the predetermined event in response to the total number of occurrences of the predetermined behavioral event (i) being within the predetermined range of total occurrences and (ii) being substantially inconsistent over the third time period.

7. The method of claim 6, wherein the first percentage is approximately 20% and the second percentage is approximately 80% percent.

8. The method of claim 5, wherein determining the avidity metric comprises determining the avidity metric according to a second order function based on historical data of the frequency of the occurrences of the predetermined behavioral event over a second time period, the second time period being a multiple of the first time period.

9. The method of claim 1, further comprising storing the behavior index on the client computer in a secure location.

10. The method of claim 1, wherein the predetermined behavioral event is an event initiated by the user on the client computer selected from the group consisting of: purchasing a predetermined product, navigating to a predetermined website, and selecting a predetermined hyperlink.

11. The method of claim 1, further comprising:

receiving, on the client computer, a request from a content provider for the behavior index;

transmitting the behavior index to the content provider in response to the request; and receiving content from the content provider in response to transmitting the behavior index.

12. The method of claim 1, wherein determining an affinity metric, determining an avidity metric, and determining a behavior analytic index are each performed by a secure processor.

13. The method of claim 12, wherein the secure processor is a processor selected from the group consisting of: a trusted platform manager (TPM) processor or an out-of-band processor.

14. A computing device comprising:
a processor;
a memory device electrically coupled to the processor, the memory device including therein a plurality of instructions that, when executed by the processor, result in the processor:

monitoring for a predetermined behavioral event initiated by a user on the computing device;

updating, in response to an occurrence of the predetermined behavioral event, a frequency of occurrences of the predetermined behavioral event, the frequency of occurrences being indicative of the number of occurrences during a first time period;

determining an affinity metric for the predetermined behavioral event based on the frequency of occurrences, wherein determining the affinity metric comprises (i) determining a frequency of occurrence of the predetermined behavioral event for each of a plurality of first time periods, (ii) comparing the determined frequencies of occurrence of the predetermined behavioral event, and (iii) determining a historical trend of the frequency of occurrence of the predetermined behavioral event over a second time period equal to the sum of the plurality of first time periods based on the comparison of the determined frequencies, wherein the second time period being a multiple of the first time period;

determining an avidity metric for the predetermined event based on the frequency of occurrences, the avidity metric being indicative of a ranking of a total number of occurrences of the predetermined behavioral event within the second time period relative to a predetermined range of total occurrences; and determining a behavior analytic index for the user based on the affinity metric and the avidity metric.

15. The computing device of claim 14, wherein determining the affinity metric comprises:

assigning a first affinity group to the predetermined behavioral event in response to the frequency of occurrences of the predetermined behavioral event being determined to be decreasing over the second time period;

assigning a second affinity group to the predetermined behavioral event in response to the frequency of occurrences of the predetermined behavioral event being determined to be increasing over the second time period;

assigning a third affinity group to the predetermined event in response to the frequency of occurrences of the predetermined behavioral event being determined to be substantially constant over the second time period; and assigning a fourth affinity group to the predetermined event in response to the frequency of occurrences of the predetermined behavioral event being determined to be substantially zero over the second time period.

16. The computing device of claim 14, wherein determining the avidity metric comprises:

assigning a first avidity group to the predetermined event in response to the total number of occurrences of the predetermined behavioral event (i) being greater than a predetermined first percentage of the predetermined range of total occurrences and (ii) being substantially consistent over a third time period, the third period of time being a multiple of the second time period;

assigning a second avidity group to the predetermined event in response to the total number of occurrences of the predetermined behavioral event (i) being less than a predetermined second percentage of the predetermined range of total occurrences and (ii) being substantially consistent over the third time period;

assigning a third avidity group to the predetermined event in response to the total number of occurrences of the predetermined behavioral event (i) being within the predetermined range of total occurrences and (ii) being substantially inconsistent over the third time period; and assigning a fourth avidity group to the predetermined event in response to the total number of occurrences of the predetermined behavioral event (i) being outside the predetermined range of total occurrences and (ii) being substantially consistent over the fourth over the third time period.

17. The computing device of claim 14, wherein the processor is a secure processor selected from the group consisting of: a trusted platform manager (TPM) processor or an out-of-band processor.

18. A non-transitory, machine readable medium comprising a plurality of instructions that, in response to being executed, result in a client computer:

determining an affinity metric for the predetermined behavioral event in response to an occurrence of a predetermined behavioral event initiated by a user on the client computer, wherein determining the affinity metric comprises (i) determining a frequency of occurrence of the predetermined behavioral event for each of a plurality of first time periods, (ii) comparing the determined frequencies of occurrence of the predetermined behavioral event, and (iii) determining a historical trend of the frequency of occurrence of the predetermined behavioral event over a second time period equal to the sum of the plurality of first time periods based on the comparison of the determined frequencies;

determining an avidity metric for the predetermined event in response to the occurrence of the predetermined behavioral event, wherein the avidity metric is indicative of a ranking of the frequency of occurrences relative to a predetermined criteria;

determining a behavioral index for the user based on the affinity metric and the avidity metric;

transmitting the behavioral index to a content provider server in response to receiving a request from the content provider server for the behavior index request; and receiving content from the content provider server in response to transmitting the behavior index, the content being selected based on the transmitted behavioral index.

19. The non-transitory, machine readable medium of claim 18, wherein the plurality of instructions further result in the client computer updating, in response to the occurrence of the predetermined behavioral event, a frequency of occurrences of the predetermined behavioral event, the frequency of occurrences being indicative of the number of occurrences during a first time period, and wherein determining the affinity metric comprises:

assigning a first affinity group to the predetermined behavioral event in response to the frequency of occurrences of the predetermined behavioral event being determined to be decreasing over the second time period;

assigning a second affinity group to the predetermined behavioral event in response to the frequency of occurrences of the predetermined behavioral event being determined to be increasing over the second time period; and assigning a third affinity group to the predetermined event in response to the frequency of occurrences of the predetermined behavioral event being determined to be substantially constant over the second time period.

20. The non-transitory, machine readable medium of claim 18, wherein the plurality of instructions further result in the client computer updating, in response to the occurrence of the predetermined behavioral event, a frequency of occurrences of the predetermined behavioral event, the frequency of occurrences being indicative of the number of occurrences during a first time period, and assigning a first avidity group to the predetermined event in response to the total number of occurrences of the predetermined behavioral event (i) being greater than a predetermined first percentage of the predetermined range of total occurrences and (ii) being substantially consistent over a third time period, the third period of time being a multiple of the second time period;

assigning a second avidity group to the predetermined event in response to the total number of occurrences of the predetermined behavioral event (i) being less than a predetermined second percentage of the predetermined range of total occurrences and (ii) being substantially consistent over the third time period; and assigning a third avidity group to the predetermined event in response to the total number of occurrences of the predetermined behavioral event (i) being within the predetermined range of total occurrences and (ii) being substantially inconsistent over the third time period.

* * * * *